(12) United States Patent
Pastula et al.

(10) Patent No.: US 7,169,495 B2
(45) Date of Patent: Jan. 30, 2007

(54) THERMALLY INTEGRATED SOFC SYSTEM

(75) Inventors: Michael Pastula, Calgary (CA); Andrea Tylczak, Calgary (CA); Pawel Fronc, Calgary (CA); Marc Dionne, Calgary (CA); Glenn Price, Calgary (CA); Bryce Sharman, Calgary (CA); Casey Brown, Calgary (CA)

(73) Assignee: Versa Power Systems, Ltd., Calgary (CA)

( * ) Notice: Subject to any disclaimer, the term of this patent is extended or adjusted under 35 U.S.C. 154(b) by 234 days.

(21) Appl. No.: 10/249,772

(22) Filed: May 6, 2003

(65) Prior Publication Data

US 2004/0224196 A1    Nov. 11, 2004

(51) Int. Cl.
*H01M 8/04* (2006.01)
*H01M 8/00* (2006.01)

(52) U.S. Cl. .............................. 429/26; 429/17; 429/22
(58) Field of Classification Search .................. 429/17, 429/22, 26
See application file for complete search history.

(56) References Cited

U.S. PATENT DOCUMENTS

| | | | |
|---|---|---|---|
| 5,366,819 A | 11/1994 | Hartvigsen et al. | |
| 5,763,114 A | 6/1998 | Khandkar et al. | |
| 6,165,633 A * | 12/2000 | Negishi | 429/17 |
| 6,551,734 B1 | 4/2003 | Simpkins et al. | 429/26 |
| 6,887,285 B2 * | 5/2005 | Deshpande | 48/127.9 |
| 2002/0108309 A1 | 8/2002 | Grieve et al. | |
| 2003/0235732 A1 * | 12/2003 | Haltiner, Jr. | 429/24 |
| 2004/0142216 A1 * | 7/2004 | Wakabayashi et al. | 429/13 |

FOREIGN PATENT DOCUMENTS

| | | |
|---|---|---|
| CA | 2298970 | 2/2000 |
| EP | 0 580 918 A | 2/1994 |
| WO | WO/95/10126 A | 4/1995 |
| WO | WO 97/31399 | 8/1997 |
| WO | WO/02/05363 A | 1/2002 |
| WO | WO 02/087052 | 10/2002 |
| WO | WO 02/05363 A2 * | 1/2005 |

OTHER PUBLICATIONS

Pastula, M., et al. "Development of Low Temperatures SofC Systems for Remote Power Applications" European Solid Oxide Fuel Cell Forum, XX, XX, vol. 1, Jul. 14, 2000, pp. 123-132.

* cited by examiner

*Primary Examiner*—Dah-Wei Yuan
(74) *Attorney, Agent, or Firm*—Bennett Jones LLP

(57) ABSTRACT

A thermally integrated fuel cell system includes a stack zone, a burner zone and a low temperature zone. The fuel is combined with steam and passed sequentially through a primary reformer and a secondary reformer. Air is split into two parallel streams and preheated in a low temperature heat exchanger. One air stream passes to a high temperature heat exchanger while the other passes to a radiative heat exchanger. The air and fuel streams are equalized in an equalization heat exchanger before entering the fuel cell stacks. The stack exhaust is combusted in an afterburner. Afterburner exhaust heats the primary reformer, the high temperature heat exchanger, the low temperature heat exchanger and steam generator. The stack zone includes the stacks, the secondary reformer, the radiative heat exchanger and the equalization heat exchanger. The burner zone includes the afterburner, the primary reformer and the high temperature heat exchanger. The low temperature zone includes the low temperature heat exchanger and the steam generator.

7 Claims, 4 Drawing Sheets

THERMALLY INTEGRATED SOFC SYSTEM

BACKGROUND OF INVENTION

The present invention relates to a thermally integrated fuel cell system.

High temperature fuel cells such as solid oxide fuel cells comprise an electrolyte sandwiched between a cathode and an anode. Oxygen reacts with electrons at the cathode to form oxygen ions, which are conducted through the ion-conducting ceramic electrolyte to the anode according to the reaction:

$$\tfrac{1}{2}O_2 + 2e \rightarrow O^{2-} \tag{1}$$

At the anode, oxygen ions combine with hydrogen and carbon monoxide to form water and carbon dioxide thereby liberating electrons according to the exothermic reactions:

$$H_2 + O^{2-} \rightarrow H_2O + 2e^- \tag{2}$$

$$CO + O^{2-} \rightarrow CO_2 + 2e^- \tag{3}$$

In conventionally-designed solid oxide fuel cells, the above electrochemical reactions usually are performed at temperatures of between 600° C. and 1000° C. Therefore, thermal management is an important consideration in the design of fuel cell systems. SOFC stacks produce high grade heat and it would obviously improve the overall efficiency of the operation if that high grade heat could be captured and utilized.

Typically, incoming fuel and air streams are preheated both during startup when the stack is at ambient temperatures and during operating conditions when the stack is at elevated temperatures. It is well known to use heat exchangers to extract heat from the stack exhausts and use that heat to preheat incoming gas streams.

In PCT Application No. PCT/US02/12315 (WO02/087052), a waste energy subassembly is provided which includes a combustion zone and a heat exchanger. A separate reformer subassembly provides reformate to the combustion zone where it is combusted to heat the system. Once at operating conditions, the stack exhaust is combusted in the combustion zone and heat is transferred to the incoming air and reformate streams in the heat exchanger. In Applicant's co-pending PCT Application No. CA01/01014, an integrated module is described which is associated with a fuel cell stack and includes an afterburner, a fuel reformer and a heat exchanger. The afterburner burns unused fuel in the fuel cell exhaust streams and heats the fuel reformer and an incoming cathode air stream.

It is a goal of both of these technologies to thermally integrate the fuel cell system and some thermal integration is achieved. However, it is apparent that further integration and better efficiencies may be achievable.

Therefore, there is a need in the art for a highly thermally integrated fuel cell system.

SUMMARY OF INVENTION

The present invention provides a thermally integrated fuel cell system. In one aspect of the invention, the invention may comprise a fuel cell system comprising a fuel cell stack and further comprising:

(a) a first air supply and second air supply connected in parallel for providing air to the stack;

(b) a first fuel supply and a second fuel supply which are connected in series for providing reformate fuel to the stack;

(c) an afterburner which burns raw fuel or unused fuel in an anode exhaust stream, or both raw fuel and unused fuel in the anode exhaust stream;

(d) means for transferring heat from the afterburner to the first air supply and the first fuel supply; and (e) means for transferring heat from the fuel cell stack to the second air supply and the second fuel supply.

In another aspect, the invention may comprise a fuel cell system including a stack comprising:

(a) a fuel supply assembly for producing a reformate stream comprising a process fuel supply, a steam generator, a primary reformer, and a secondary reformer;

(b) an air supply assembly comprising a low temperature heat exchanger, a first stream including a high temperature heat exchanger, a second stream including a radiative heat exchanger;

(c) an equalization heat exchanger which receives the reformate supply, the first stream air supply and the second stream air supply and outputs a temperature equalized reformate stream and an air stream to the fuel cell stack; and (d) an afterburner which receives the anode and cathode exhaust streams from the fuel cell stack and combusts the exhaust streams to produce a combustion stream;

(e) wherein the steam generator, low temperature heat exchanger are grouped in a low temperature zone;

(f) and wherein the afterburner, high temperature heat exchanger and primary reformer are grouped in a high temperature zone;

(g) and wherein the secondary reformer, radiative heat exchanger, equalization heat exchanger and fuel cell stack are grouped in a stack zone.

In another aspect, the invention may comprise a fuel cell system including a fuel cell stack comprising:

(a) an fuel supply assembly for supplying reformate to the stack comprising a prereformer fuel supply, a steam generator, a primary reformer, and a secondary reformer;

(b) an air supply assembly for supplying air to the stack comprising a low temperature heat exchanger, a first stream including a high temperature heat exchanger, and a second stream including a radiative heat exchanger;

(c) an afterburner which receives the anode and cathode exhaust streams from the fuel cell stack and combusts the exhaust streams to produce a combustion stream;

wherein the combustion stream provides heat energy to the primary reformer, the high temperature heat exchanger, the steam generator and the low temperature heat exchanger; and wherein the radiative heat exchanger and secondary reformer receive radiative heat energy from the stack.

BRIEF DESCRIPTION OF DRAWINGS

The invention will now be described by way of an exemplary embodiment with reference to the accompanying simplified, diagrammatic, not-to-scale drawings. In the drawings.

DETAILED DESCRIPTION

The present invention provides for a thermally integrated fuel cell system. When describing the present invention, all terms not defined herein have their common art-recognized meanings.

Generally, a system of the present invention achieves thermal integration primarily by exchanging heat from the exhaust side to the intake side of the fuel cell system in order to preheat the intake streams. As well, radiative heat from the fuel cell stack itself is captured. The features of the invention described herein enhance the efficiency or controllability of the system.

Figure 1:
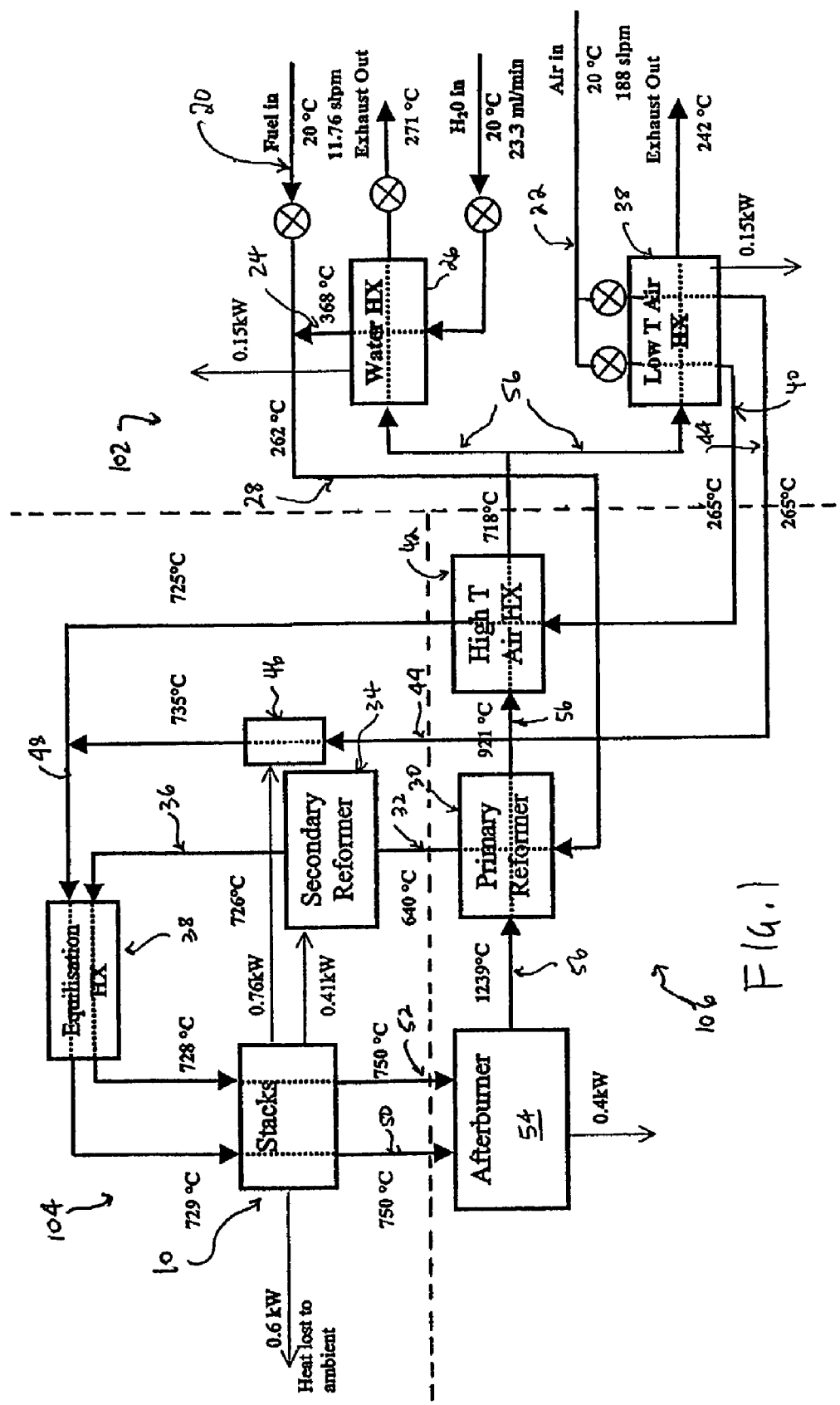
FIG. 1 is a schematic representation of one embodiment of the present invention.
Figure 1A:
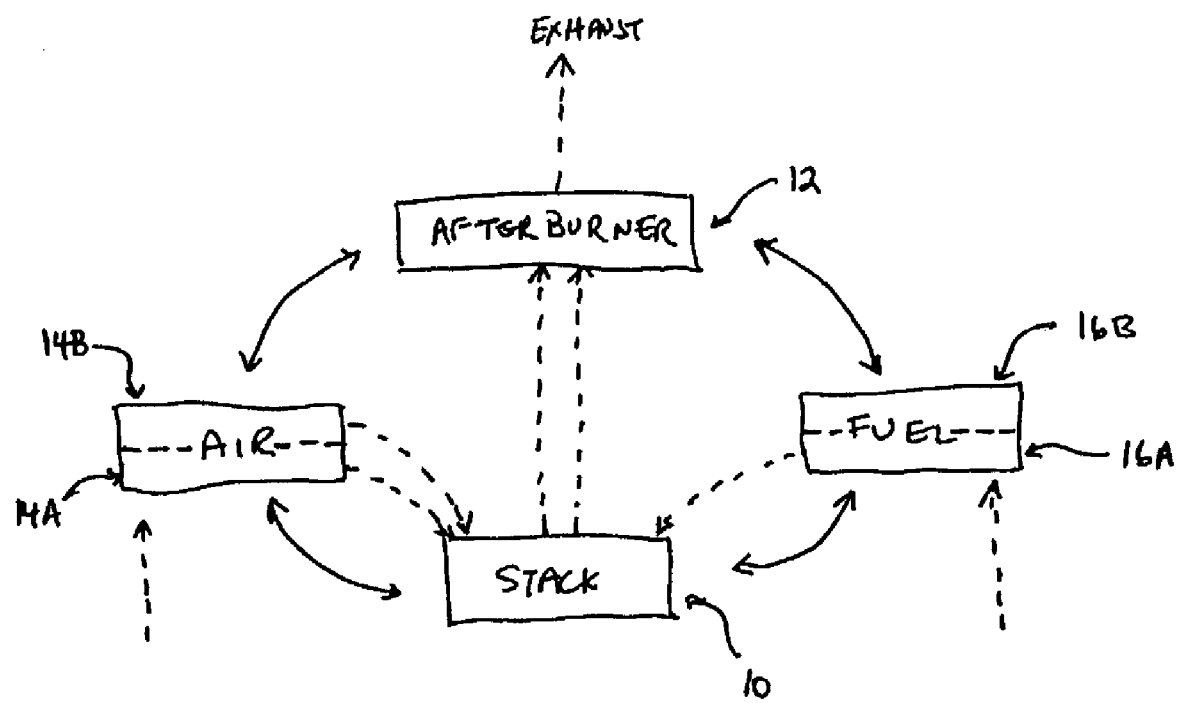
FIG. 1A is an alternative schematic representation of one embodiment of the present invention.

FIG. 1A shows a generalized schematic representation of the high grade heat sinks and heat sources of the present invention. The solid arrows represent heat exchange and not fluid flows. The dashed line arrows represent fluid flows. The system includes two heat sources, which are the fuel cell stack (10) itself, and an afterburner (12). The system of the present invention includes two heat sinks, which are the process air stream (14) and the process fuel stream (16). The latter includes a fuel reformer. As depicted in FIG. 1A, each of the two heat sinks receives heat from both heat sources. In a preferred embodiment, the two heat sinks are each separated into two separate parts. Therefore, one part (14A) of the process air stream receives heat from the stack, while a second part (14B) of the process air stream receives heat from the afterburner. Similarly, one part (16A) of the process fuel stream receives heat from the stack while a second part (16B) of the process fuel stream receives heat from the afterburner. This division of the heat sinks permits greater controllability of the thermal integration of the system. The control system may divert greater flow through a first part of the air heat sink from the second part, which will have the effect of increasing cooling of the heat source associated with first part of the air flow.

In a preferred embodiment, the first and second parts of the process air stream flow in parallel while the first and second parts of the process fuel stream flow in series. Furthermore, there is no direct thermal link between the two heat sources. More preferably, the two heat sources are isolated from each other with thermal insulation, thus not degrading the thermal availability of either heat source.

The split of the two heat sinks, the process air stream and the process fuel stream, into two parts, one part of which is thermally linked to the stack as a high grade heat source, and another part of which is thermally linked to the afterburner as the other high grade heat source, permits greater controllability of the system. For example, the stack may be cooled by directing a greater proportion of the process air stream through the part which is thermally linked to the stack. In another example, if greater fuel utilization results in less heat produced by the afterburner, more heat from the stack may be utilized by the heat sinks. These and other control strategies will be apparent to those skilled in the art.

In one embodiment of the present invention, as shown schematically in FIG. 1, a fuel cell system comprises a process fuel source (20) and a process air source (22) both of which may be at ambient temperatures. The fuel stream (20) is combined with steam (24) generated by a steam generator (26) or a water heat exchanger. The combined steam/fuel stream (28) then enters a primary reformer (30) which reforms the fuel to hydrogen or a mixture of hydrogen and carbon monoxide (syngas) using any reforming process such as catalytic steam reforming, or partial oxidation reforming or some combination of these reforming processes. In one embodiment, the primary reformer is a steam reformer implementing steam reformation of a hydrocarbon such as natural gas. The reformate stream (32) then passes into a secondary reformer (34) where additional reforming to hydrogen or syngas takes place, leveraging heat from the stack when needed. The secondary reformer may implement the same or different reforming process as the primary reformer.

In an alternative embodiment, the fuel may be mixed with water prior to entering into the steam generator (26) or water heat exchanger.

The secondary reformate stream (36) is then passed through a equalization heat exchanger (36) which serves to equalize the temperature between the reformate stream (36) and the heated air stream (48) before entering the fuel cell stack (10). The equalization heat exchanger is an optional component and may assist in minimizing the temperature gradients between the stack and the incoming reactants.

The air source (22) passes into a low temperature heat exchanger (38) where it is split into two streams. A valve (39) or diverter, or independent valves, may direct air equally into both streams, into one stream to the exclusion of the other, or direct a greater proportion of air into one stream. It is preferably to split the air stream prior to entry into the low temperature heat exchanger so as to avoid the need for high temperature materials for the valves (39). A first air stream (40) is passed to a high temperature heat exchanger (42) while the second air stream (44) goes on to a radiative heat exchanger (46). The two streams from the high temperature heat exchanger (42) and the radiative heat exchanger (46) are then combined into a heated air stream (48) before entering the equalization heat exchanger (36).

Once reacted in the stacks, the cathode exhaust (50) and the anode exhaust (52) pass into an afterburner assembly (54) where any residual fuel in the exhaust stream is combusted. The cathode and anode exhausts are combined at this stage, and the cathode exhaust preferably provides sufficient residual oxygen necessary for combustion of any remaining combustible fuel in the afterburner. The afterburner exhaust (56) is used first to heat the fuel input stream in the primary reformer (30) and the air input stream in the high temperature heat exchanger (42). In one embodiment, the afterburner (54) is coupled with the primary reformer (30) and the high temperature heat exchanger in an integrated module (not shown).

The hot exhaust stream (56) may then be used to heat the steam generator (26) on the fuel side and the low temperature heat exchanger (38) on the air side. The exhaust stream may be split to heat these heat exchange elements, or they may be heated in series. In one embodiment, the secondary reformer (34) and the radiative heat exchanger (46) are positioned to receive radiative energy from the stacks (10). The heat from the stacks is available from the inefficiency in the electrochemical reactions. In one embodiment, show in FIGS. 2 and 3, the secondary reformer (34) and the radiative heat exehanger (46) are planar elements which enclose, or partially enclose, the fuel cell stack.

The afterburner may also include a startup burner, or startup burner capability, which burns unreformed fuel and exhausts into the same exhaust as the afterburner (56).

Figure 2:
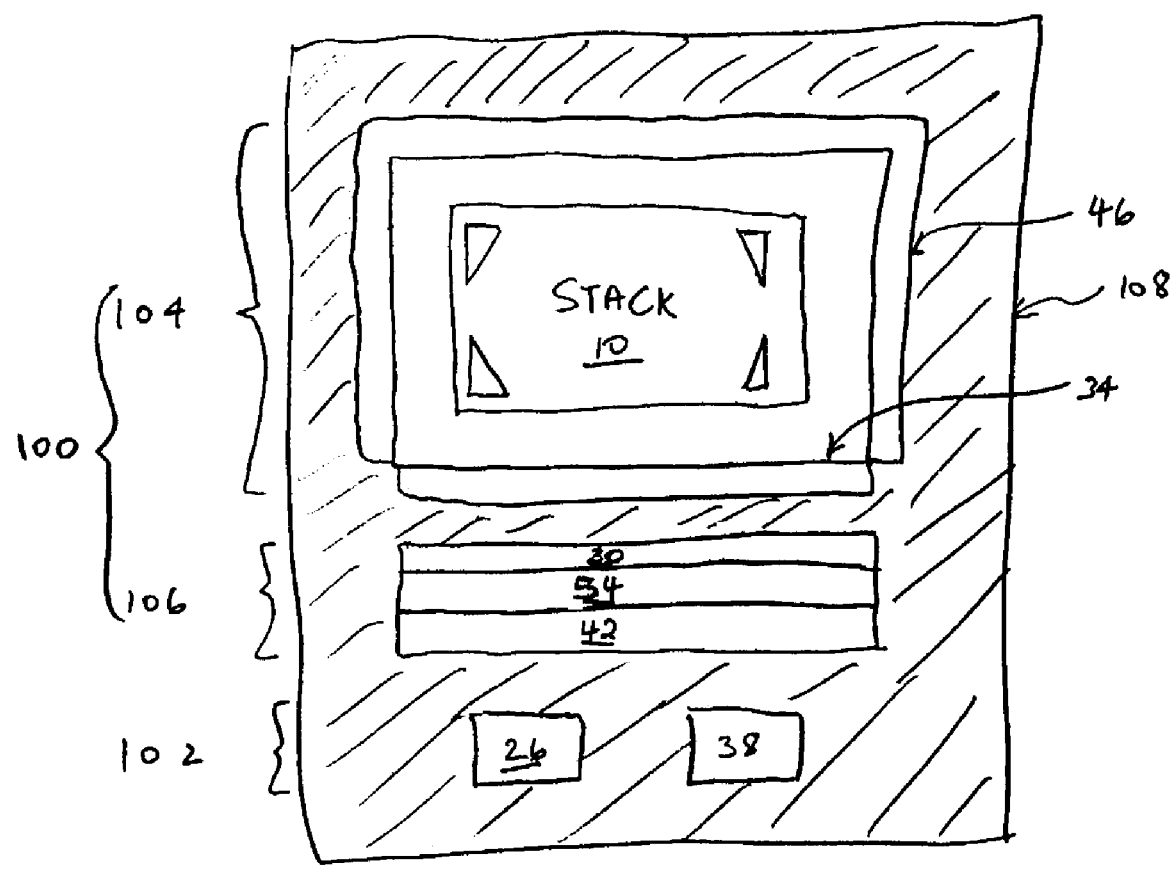
FIG. 2 is a cross-sectional schematic showing the different zones of a system of the present invention.

In one embodiment, the implementation of the system described above may be divided into a hot zone (100) and a low temperature zone (102). The low temperature zone includes the low temperature air heat exchanger (38) and steam generator (26). The hot zone (100) may be further divided into a stack zone (104) and a burner zone (106), which in one embodiment may be an integrated module. As shown in FIG. 2, the stack zone (104) includes the fuel cell stacks (10), the radiative heat exchanger (46), the equalization heat exchanger (38) and the secondary reformer (34). The secondary reformer and the radiative heat exchanger may enclose the stacks (10) and be configured to be directly exposed to the stacks to capture a maximum amount of heat from the stacks. The stack zone is insulated (108) to minimize ambient heat loss. The burner zone or integrated module (106) is also a high temperature zone which includes the afterburner, the high temperature air heat exchanger and the primary reformer. The burner zone or integrated module (106) is also insulated.

In one embodiment, the stack zone is contained as a stack compartment, which is vented through a catalytic converter, which may be electrically heated for startup, shutdown or other low-temperature operation. Any fuel gases which leak from the stacks are contained within the stack compartment and are eliminated by the catalytic converter before being vented to the atmosphere. The equalization heat exchanger (38) and a stack compartment burner (50) are disposed within the stack compartment.

Figure 3:
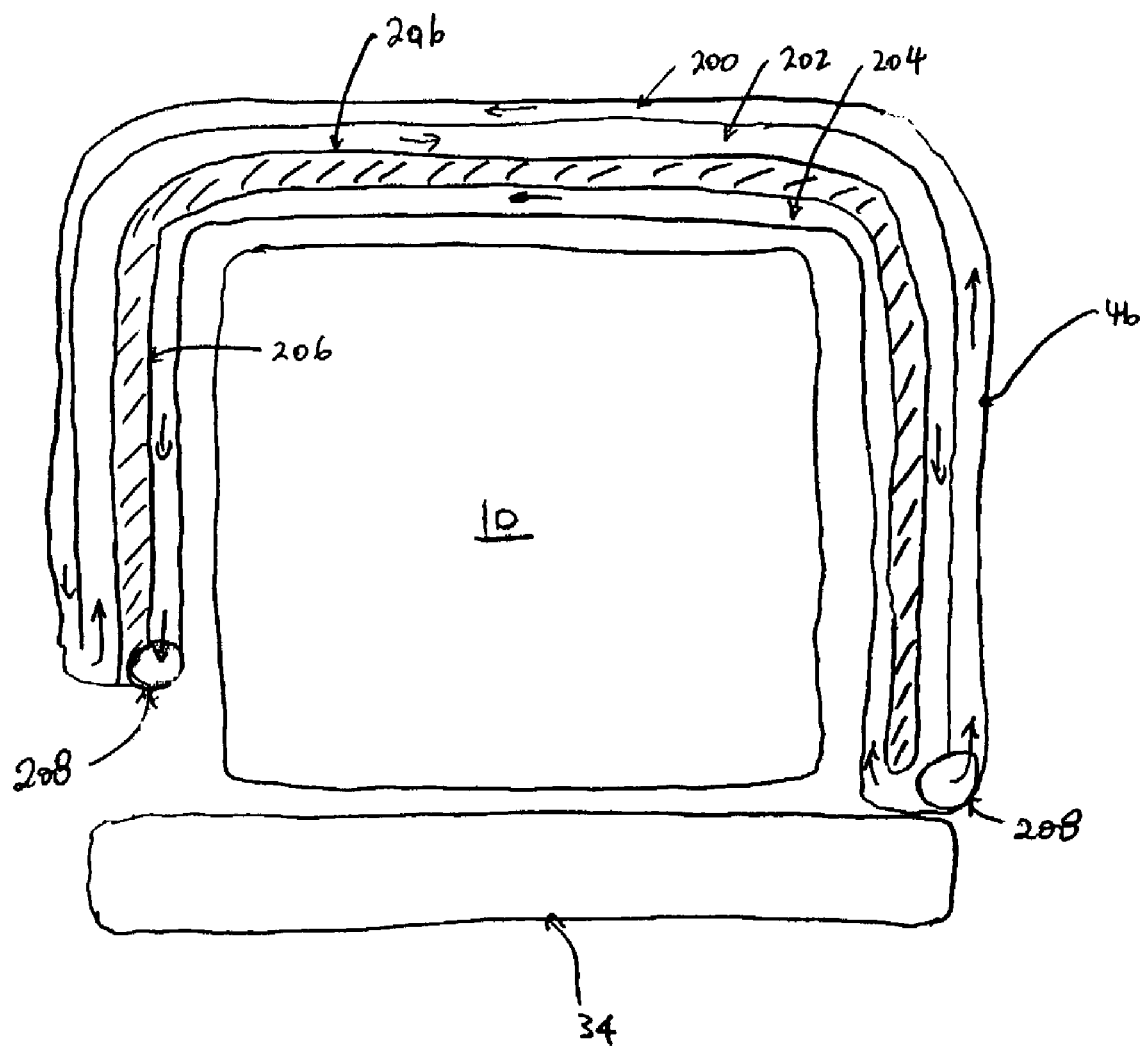
FIG. 3 is a cross-sectional detail of the stack zone of one embodiment.

One embodiment of the stack zone is shown in horizontal cross-section in FIG. 3. The horizontal footprint of the stacks (10) is quadrilateral. Accordingly, the stack enclosure is parallel to the vertical longitudinal axis of the stack and is also quadrilateral. In one embodiment, the radiative heat exchanger forms three sides of the enclosure while the secondary reformer forms the fourth side. The equalization heat exchanger may then be disposed below the stack, which is not shown in FIG. 2 or 3. In other embodiments, the stack enclosure may be circular or another geometry may be used.

Startup of the stacks (10) when the whole system is at an ambient temperature is initiated by first purging the cathode and exhaust streams, as well as the stack compartment, with air. Process air flow is started, primarily through the first stream, thereby avoiding the radiative heat exchanger (46). In one embodiment, a stack compartment heater is provided within the stack zone to provide initial heat to the stacks. The stack compartment heater may be an electric heater or a burner and is typically fired first in a startup procedure. Once the stack compartment heater has raised the stack temperature to about 200° C., the startup burner associated with the afterburner is then ignited.

At this stage, the preferred startup sequence depends on whether an anode purge gas is used or not. Anode purge gas may comprise a mixture of nitrogen or argon with a small amount of hydrogen, and serves to preserve a reducing atmosphere in the fuel reformers as well as the SOFC anodes as the system heats up. If anode purge gas is used, the purge gas flow is initiated after firing of the stack compartment heater and after firing of the startup burner. Once the startup burner and the stack compartment burner have brought up the stack temperature to about 700° C., or slightly below the stack operating temperature, the switch from purge gas to process fuel may take place.

If no anode purge gas is used and the startup procedure utilizes process fuel and reformate only, then the process fuel flow is initiated after the startup burner is ignited. For steam reformation type systems, it is preferred to ensure the steam to carbon ratio of the process fuel flow is approximately 2.6 while at operating temperatures to prevent carbon deposition within the system. The steam to carbon ratio may be ramped up from a lower value to the operating value during a startup procedure as thermodynamic properties and equilibrium conditions of the reactants allow.

The hot exhaust from the startup burner heats the primary reformer (30), and both the high temperature and low temperature heat exchangers (42, 38) as well as the steam generator (26). As the primary reformer reaches its operating temperature, and the air heat exchangers heat the air, the fuel cell stacks begin operating and the exothermic reactions with the stacks produce electricity and heat. It is preferred during startup to direct all or a majority of air flow through the first stream (40) thereby avoiding the radiative heat exchanger (46). Once the fuel cell stacks (10) approach operating temperatures and begin operating, sufficient radiative heat is produced to allow use of the radiative heat exchanger (46) as well as the high temperature heat exchanger (42). Once the fuel cell stacks reach an operating temperature, then the stack compartment burner may be shutdown.

It is preferred to provide thermal insulation between the stack zone and the burner zone to permit greater thermal control of the system. The temperature of the stack zone may be independently controlled with greater precision by eliminating or reducing conductive heat transfer from the burner zone to the stack zone.

As will be apparent to those skilled in the art, various modifications, adaptations and variations of the foregoing specific disclosure can be made without departing from the scope of the invention claimed herein. The various features and elements of the described invention may be combined in a manner different from the combinations described or claimed herein, without departing from the scope of the invention.

The invention claimed is:

1. A fuel cell system including a fuel cell stack comprising:
   (a) a fuel supply assembly for supplying reformate to the stack comprising:
      a prereformer fuel supply,
      a steam generator,
      a primary reformer, and
      a secondary reformer, said secondary reformer partially enclosing the fuel cell stack;
   (b) an air supply assembly for supplying air to the stack comprising:
      a low temperature heat exchanger,
      a first stream including a high temperature heat exchanger, and
      a second stream including a radiative heat exchanger, said radiative heat exchanger partially enclosing the fuel cell stack;
   (c) an afterburner which receives the anode and cathode exhaust streams from the fuel cell stack and combusts the exhaust streams to produce a combustion stream;
   (e) wherein the combustion stream provides heat energy to the primary reformer, the high temperature heat exchanger, the steam generator and the low temperature heat exchanger; and wherein
   (f) the radiative heat exchanger and secondary reformer receive thermal radiative heat energy from the stack.

2. The fuel cell stack system of claim 1 further comprising an equalization heat exchanger which receives a reformate supply, the first stream air supply and the second stream air supply and outputs a temperature equalized reformate stream and an air stream to the stack.

3. The fuel cell stack system of claim 1 or 2 further comprising a startup heater associated with the afterburner, wherein the startup heater heats the system downstream from the afterburner.

4. The fuel cell stack system of claim 3 further comprising a stack heater for externally heating the stack.

5. The fuel cell stack system of claim 1 wherein the radiative fuel exchanger comprises at least one planar surface exposed to the fuel cell stack.

6. The fuel cell stack system of claim 1 wherein the radiative fuel exchanger comprises planar surfaces exposed to the fuel cell stack.

7. The fuel cell stack system of claim 1 wherein the secondary reformer comprises a planar surface exposed to the fuel cell stack.

* * * * *